United States Patent
Ito et al.

(10) Patent No.: US 7,690,622 B2
(45) Date of Patent: Apr. 6, 2010

(54) DIAPHRAGM-TYPE ELECTROMAGNETIC VALVE WITH CLOSING-FORCE STRENGTHENING MECHANISM

(75) Inventors: Yoshihiko Ito, Tsukubamirai (JP); Hideyuki Takada, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 434 days.

(21) Appl. No.: 11/776,140

(22) Filed: Jul. 11, 2007

(65) Prior Publication Data
US 2008/0029725 A1 Feb. 7, 2008

(30) Foreign Application Priority Data
Aug. 7, 2006 (JP) ............... 2006-214901

(51) Int. Cl.
*F16K 31/12* (2006.01)
(52) U.S. Cl. .............. 251/30.02; 251/129.17
(58) Field of Classification Search ........ 251/30.01, 251/30.02, 129.15, 129.17
See application file for complete search history.

(56) References Cited

U.S. PATENT DOCUMENTS

| | | | |
|---|---|---|---|
| 4,186,649 A | 2/1980 | Sundstrom | |
| 4,783,044 A * | 11/1988 | Ellison | 251/30.02 |
| 5,020,771 A * | 6/1991 | Nakatsukasa et al. | 251/30.02 |
| 5,988,524 A | 11/1999 | Odajima et al. | |
| 6,415,818 B2 | 7/2002 | Dickman et al. | |
| 6,755,354 B2 * | 6/2004 | Fukano et al. | 239/119 |
| 6,988,710 B2 | 1/2006 | Igarashi | |

FOREIGN PATENT DOCUMENTS

| | | |
|---|---|---|
| DE | 40 30 982 A1 | 4/1992 |
| DE | 198 10 657 A1 | 10/1998 |
| EP | 0 478 951 B1 | 4/1992 |
| JP | 49-49131 | 12/1974 |
| JP | 52-106075 | 9/1977 |
| JP | 3-26884 | 3/1991 |
| JP | 6-2777 | 1/1994 |
| JP | 2001-304436 | 10/2001 |
| JP | 2004-100889 | 4/2004 |
| JP | 2004-162774 | 6/2004 |

* cited by examiner

*Primary Examiner*—John K Fristoe, Jr.
(74) *Attorney, Agent, or Firm*—Oblon, Spivak, McClelland, Maier & Neustadt, L.L.P.

(57) ABSTRACT

An auxiliary valve member, an auxiliary pilot pressure chamber for applying a pilot fluid pressure to the auxiliary valve body, and a transmitting rod for transmitting operating force of the auxiliary valve body to a main diaphragm are provided other than the main diaphragm which is in contact with or separating from a main valve seat by operating by means of application of the pilot fluid pressure in a diaphragm valve portion, as a mechanism for strengthening valve-closing force of the main diaphragm, so as for the main diaphragm not to be separated from the valve seat even when the fluid pressure from a load is applied to the main diaphragm as adverse pressure.

9 Claims, 6 Drawing Sheets

DIAPHRAGM-TYPE ELECTROMAGNETIC VALVE WITH CLOSING-FORCE STRENGTHENING MECHANISM

TECHNICAL FIELD

The present invention relates to a diaphragm-type electromagnetic valve that opens and closes a flow path by causing a diaphragm to be in contact with or to be separated from a valve seat, and more particularly to a diaphragm-type electromagnetic valve provided with a closing-force strengthening mechanism by means of the aforementioned diaphragm.

BACKGROUND ART

In general, a diaphragm-type electromagnetic valve has a valve structure as a two-port valve as disclosed in, for example, Japanese Unexamined Patent Application Publication No. 2001-304436. This diaphragm-type electromagnetic valve is configured to open and close a flow path by causing a diaphragm to be in contact with or to be separated from a valve seat that is formed in a half way of the flow path connecting a supply port with an output port. In addition, the diaphragm-type electromagnetic valve is configured to be operated to open and close the diaphragm by means of an internal pilot type solenoid-operated pilot valve.

Oxygen condensation is one of intended purposes of such a diaphragm-type electromagnetic valve. The oxygen condensation is performed, as illustrated in FIG. 7 by marks for example, by forming an electromagnetic valve assembly while mounting first to fourth diaphragm-type electromagnetic valves 1a, 1b, 1c, and 1d, respectively, on a manifold base 2 provided with a flow path 3 for use in supplying in a lump, a flow path 4 for use in discharging in a lump, and two of flow paths 5a and 5b for use in output. The oxygen condensation is performed by respectively connecting first and second tanks 6a and 6b serving as containers for use in nitrogen adsorption with the aforementioned two of flow paths 5a and 5b for use in output. The oxygen condensation is performed by supplying compressed air to or discharging the same from the aforementioned tanks 6a and 6b, while selectively and relevantly operating the aforementioned four diaphragm-type electromagnetic valves 1a, 1b, 1c, and 1d.

However, for example, when the compressed air is supplied to the second tank 6b by switching the second diaphragm-type electromagnetic valve 1b from an illustrated closed-valve position to an open-valve position in a condition where the first diaphragm-type electromagnetic valve 1a is again switched to an illustrated closed-valve position, and a filled-up condition is held after the compressed air is supplied to the first tank 6a by switching the first diaphragm-type electromagnetic valve 1a from an illustrated valve-closed position to a valve-open position, and the compressed air is filled up, air pressure in the aforementioned flow path 3 for use in supplying in a lump is temporarily lowered. Thereby, the diaphragm of the first electromagnetic valve 1a is sometimes temporarily pressed open by an operation of adverse pressure from the first tank 6a. This can be said for a case when compressed air is supplied to the first tank 6a by means of the first diaphragm-type electromagnetic valve 1a in a condition where the compressed air is filled up and held in the second tank 6b by means of the second diaphragm-type electromagnetic valve 1b as well.

Thus, the diaphragm-type electromagnetic valve sometimes performs unstable behavior due to an operation of adverse pressure from a load depending on a direction for use. Therefore, this results in lowering of reliability or accuracy of fluid-controlling devices, and there is a demand for early improvement therefor.

DISCLOSURE OF THE INVENTION

Consequently, an object of the present invention is to provide a diaphragm-type electromagnetic valve having strong valve-closing force and good operation stability, in which there is no possibility for a diaphragm to open a valve seat even when a fluid pressure from a load is applied to the diaphragm as adverse pressure.

So as to achieve the aforementioned object, the present invention provides a diaphragm-type electromagnetic valve with closing-force strengthening mechanism characterized by including a diaphragm valve portion including, a supply port and an output port for use in a main fluid opening to the aforementioned attaching surface, a main valve seat positioned in a half way of a main flow path connecting both of the ports, a main diaphragm for opening and closing the aforementioned main flow path while being in contact with or separating from the main valve seat, and a main pilot pressure chamber generating operating force in a direction for the main diaphragm to be in contact with the aforementioned main valve seat, in a housing having the attaching surface for attaching the housing to a manifold base, and a solenoid-operated type pilot valve portion for supplying and discharging a pilot fluid to the aforementioned main pilot pressure chamber, in which the aforementioned diaphragm valve portion further includes, an auxiliary valve body for strengthening valve-closing force of the main diaphragm, an auxiliary pilot pressure chamber for applying the pilot fluid from the aforementioned pilot valve portion to the auxiliary valve body, and a transmitting rod for transmitting operating force of the auxiliary valve body to the aforementioned main diaphragm by displacing in junction with the aforementioned auxiliary valve body.

In the present invention, preferably, the aforementioned auxiliary valve body and the transmitting rod are disposed in serial with the aforementioned main diaphragm in a concentric position with the main diaphragm, and the aforementioned main pilot pressure chamber and the auxiliary pilot pressure chamber are allowed to communicate with each other.

Further, in the present invention, preferably, by setting a range of stroke of the aforementioned auxiliary valve body to be larger than an operating stroke of the main diaphragm, the auxiliary valve body is configured to occupy a position short of a stroke end when the pilot fluid is supplied into both the aforementioned pilot pressure chambers, and the main diaphragm is thereby in contact with the main valve seat.

In the present invention, the aforementioned auxiliary valve body can also be formed from a piston, or can also be formed from the diaphragm formed to have a same shape and same size as a shape and size of the aforementioned main diaphragm.

When the auxiliary valve body is formed from a piston, preferably, the aforementioned transmitting rod is integrally formed with the piston, and the aforementioned auxiliary pilot pressure chamber and the main pilot pressure chamber are allowed to communicate with each other by means of a continuous hole penetrating through an inner part of the piston and the transmitting rod.

Furthermore, in the present invention, preferably, the aforementioned housing is composed of a first block having the aforementioned attaching surface, a second block connected to the first block, and a third block connected to the second block, and in which the aforementioned main diaphragm is disposed between the aforementioned first block and the second block, and the aforementioned auxiliary valve body is disposed between the second block and the third block, and the aforementioned transmitting rod is provided in the second block, and in which a diaphragm-type electromagnetic valve having no closing-force strengthening mechanism can be formed by removing the aforementioned second block, the auxiliary valve body, and the transmitting rod, and by connecting the aforementioned first block and the third block each other via the main diaphragm.

According to the present invention, since the valve-closing force exerted by the main diaphragm is strengthened by means of the auxiliary valve body, there is no possibility for the main diaphragm to open the main valve seat even when the fluid pressure from the load is applied to the main diaphragm as adverse pressure. This results in good operation stability.

BEST MODE FOR CARRYING OUT THE INVENTION

Figure 1:
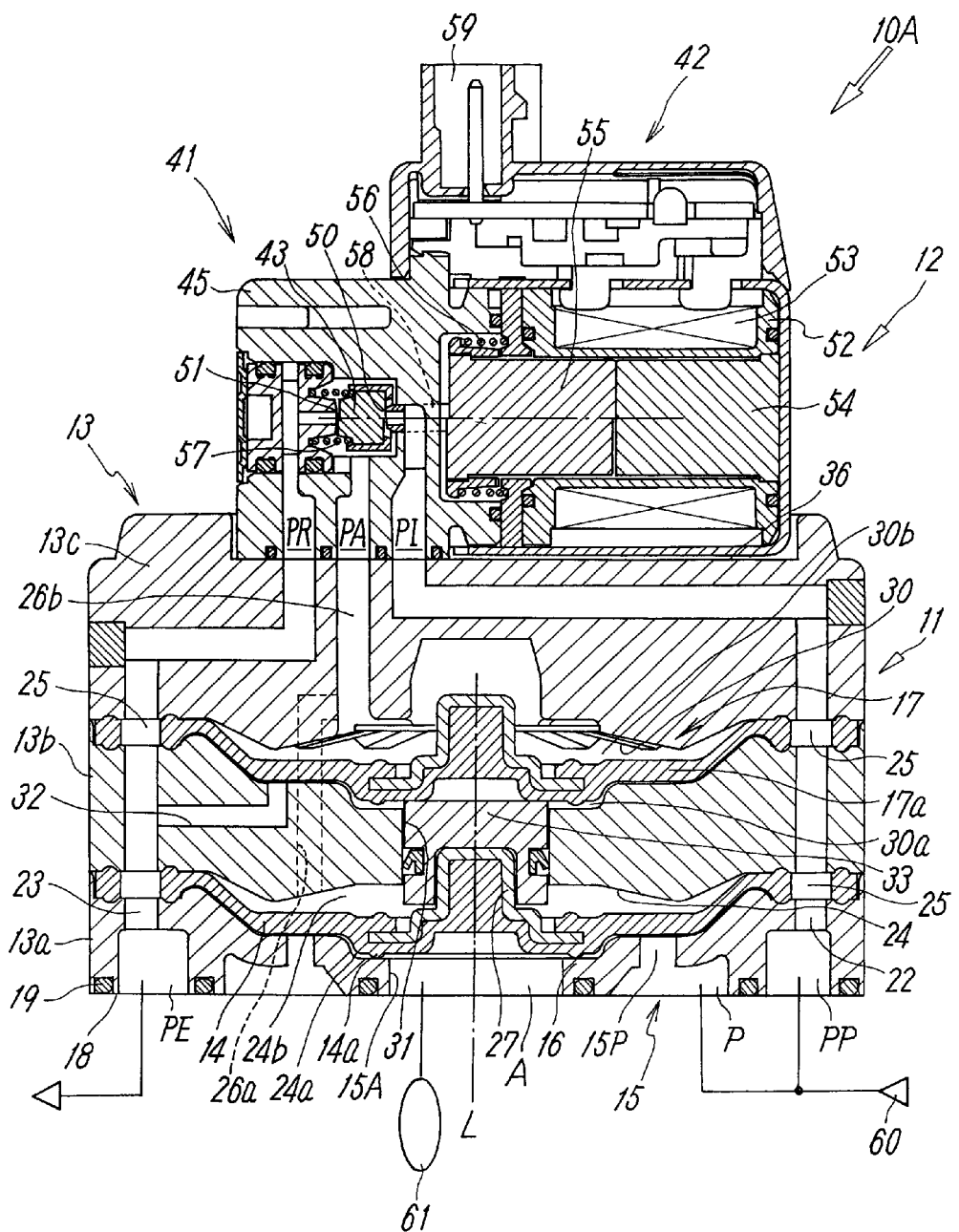
FIG. 1 is a cross-sectional view illustrating a diaphragm-type electromagnetic valve with a closing-force strengthening mechanism according to a first embodiment with respect to the present invention.
Figure 2:
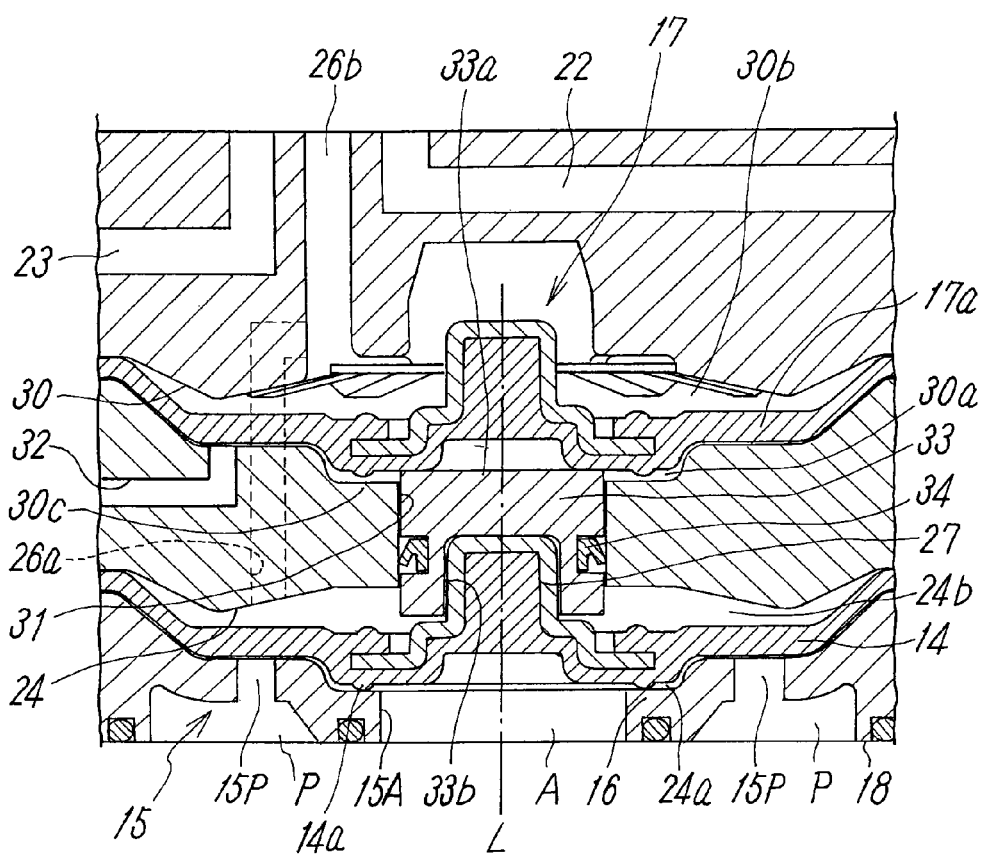
FIG. 2 is a partially enlarged view of FIG. 1.

FIG. 1 and FIG. 2 illustrate a first embodiment of a diaphragm-type electromagnetic valve with a closing-force strengthening mechanism according to the present invention (hereinafter, sometimes referred to as "electromagnetic valve", simply). An electromagnetic valve 10A according to the first embodiment is composed of a diaphragm valve portion 11 constructed so as to open and close a main flow path by causing a main diaphragm 14 to be in contact with or to be separated from a main valve seat 16 in a half way of a main flow path 15 connecting a supply port P with an output port A, and a solenoid-operated type pilot valve portion 12 that operates to open and close the aforementioned main diaphragm 14 by means of supplying and discharging a pilot fluid. Further, the aforementioned diaphragm valve portion 11 is provided with an auxiliary valve body 17 constructed with a diaphragm 17a as a mechanism for strengthening valve-closing force of the aforementioned main diaphragm 14.

In a below mentioned explanation, the diaphragm 17a that forms the aforementioned auxiliary valve body 17 is called as "auxiliary diaphragm".

The aforementioned diaphragm valve portion 11 is provided with a housing 13 having a substantially rectangular shape in a flat-surface looking. A lower surface of the housing 13 is configured to be a substantially flat attaching surface 18 to be attached to a valve mounting surface of a manifold base. On the attaching surface 18, the aforementioned supply port P, the output port A, a pilot supply port PP, and a pilot discharge port PE. Further, a sealing member 19 surrounding a periphery of each of the ports is attached to the attaching surface 18.

A positional relationship among the aforementioned each of the ports P, A, PP, and PE is that the round output port A is disposed in the center of the aforementioned attaching surface 18, the circular shaped supply port P is concentrically disposed in a manner so as to surround the periphery of the output port A, and the pilot supply port PP and the pilot discharge port PE are disposed at a position facing each other while sandwiching a center axis line L of the aforementioned output port A at an out side of the supply port P.

In an inside of the aforementioned housing 13, a supply side main flow path 15P, which is allowed to communicate with the aforementioned supply port P, an output side main flow path 15A communicating with the output port A, a pilot supply flow path 22, which is allowed to communicate with a pilot supply port PP, and a pilot discharge flow path 23, which is allowed to communicate with a pilot discharge port PE are extending upward in a manner so as to be in parallel with the aforementioned center axis line L. In the aforementioned, the supply side main flow path 15P and the output side main flow path 15A constitute part of the aforementioned main flow path 15, and are respectively allowed to communicate with a main valve chamber 24 where the aforementioned main diaphragm 14 is housed. Further, the supply side main flow path 15P and the output side main flow path 15A are allowed to communicate with each other through the main valve chamber 24. The aforementioned main valve seat 16 is formed in the main valve chamber 24 in a manner so as to surround a periphery of the aforementioned output side main flow path 15A which opens to the main valve chamber 24.

The aforementioned supply side main flow path 15P having a circular shape is partitioned into a plurality of hole portions having an arc shape by that an outer peripheral wall thereof and an inner periphery side wall partitioning the output side main flow path 15A are connected to each other with a plurality of connecting walls in a radial direction.

Further, the aforementioned pilot supply flow path 22 and the pilot discharge flow path 23 further extend while passing through a continuous holes 25 formed at end portions of both the aforementioned main diaphragm 14 and the diaphragm 17a, and are respectively allowed to communicate with a pilot supply port PI of the aforementioned pilot valve portion 12 and a pilot discharge port PR.

The aforementioned main diaphragm 14 is formed into a round disk shape with a material having rubber-elasticity, and the outer peripheral portion thereof is air-tightly held by the housing 13. Thereby, the main diaphragm 14 is disposed in a concentric position with the aforementioned output port A in a manner so as for a center portion thereof to be displaceable in a direction where the center portion thereof is in contact with or separated from the aforementioned main valve seat 16 (upper and lower direction). Furthermore, the aforementioned main valve chamber 24 is partitioned into a main flow path side portion 24a where the aforementioned main valve seat 16 is positioned and a main pilot pressure chamber 24b at an opposite side by means of the main diaphragm 14. This main pilot pressure chamber 24b is allowed to communicate with a pilot output port PA of the aforementioned pilot valve portion 12 through continuous holes 26a and 26b.

At a lower surface of the aforementioned main diaphragm 14, a circularly shaped valve sealing portion 14a that closes the main valve seat 16 by being in contact with the aforementioned main valve seat 16 is formed. At a center portion of an upper surface of an opposite side, a projection-shaped cap 27 formed from a hard material such as metal, synthetic resin, or the like is attached.

Moreover, the aforementioned auxiliary diaphragm 17*a* is disposed in a concentric and a serial manner with the aforementioned main diaphragm 14 in an auxiliary valve chamber 30 formed at a position of a side of the aforementioned main diaphragm 14 inside the housing 13 opposite to the attaching surface 18. This auxiliary diaphragm 17*a* is formed to have a same shape and same size as the main diaphragm 14 with a similar material as the aforementioned main diaphragm 14. The aforementioned auxiliary valve chamber 30 is partitioned by the auxiliary diaphragm 17*a* into a transmitting chamber 30*a* at one side and an auxiliary pilot pressure chamber 30*b* at the other side. In the aforementioned, the transmitting chamber 30*a* is allowed to communicate with the aforementioned main pilot pressure chamber 24*b* through a transmitting hole 31. Further, the aforementioned auxiliary pilot pressure chamber 30*b* is allowed to communicate with a pilot output port PA through the aforementioned continuous hole 26*b*.

Accordingly, the aforementioned main pilot pressure chamber 24*b* and the auxiliary pilot pressure chamber 30*b* are allowed to communicate with each other, and the pilot fluid is configured to be supplied from the aforementioned pilot output port PA through the aforementioned continuous holes 26*a* and 26*b* at the same time. When the pilot fluid is supplied into the pilot pressure chambers 24*b* and 30*b*, the aforementioned main diaphragm 14 and the auxiliary diaphragm 17*a* are operated at the same time.

The aforementioned transmitting chamber 30*a* is allowed to communicate with the aforementioned pilot discharge flow path 23 through a breathing communication hole 32. In addition, the aforementioned transmitting hole 31 extends along the aforementioned center axis line L and the aforementioned transmitting chamber 30*a* and the main pilot pressure chamber 24*b* are allowed to communicate with each other at positions of center portions thereof.

Between the aforementioned auxiliary diaphragm 17*a* and the main diaphragm 14, a cylindrical transmitting rod 33 that transmits operating force between both the diaphragms is provided. The transmitting rod 33 is disposed in the aforementioned transmitting hole 31 in a manner so as to be slidable along the axis line L. A flat base end portion 33*a* of the transmitting rod 33 is in contact with a lower surface of the auxiliary diaphragm 17*a*, and the cap 27 of an upper surface of the aforementioned main diaphragm 14 fits into a concavity 33*b* formed at a tip end portion of the transmitting rod 33 and is in contact therewith. Accordingly, the transmitting rod 33 is also positioned in a concentric manner with both the aforementioned main diaphragm 14 and the auxiliary diaphragm 17*a*, and is displaced together with a displacement of these diaphragms in the same direction in conjunction with the displacement of these diaphragms.

Incidentally, the tip end portion of the aforementioned transmitting rod 33 may be formed into a flat surface having no concavity 33*b* and the flat tip end portion may be in contact with the cap 27 of the upper surface of the main diaphragm 14.

In a circular concave groove formed at an outer periphery of the aforementioned transmitting rod 33, a sealing member 34 for sealing a gap between an outer periphery of the transmitting rod 33, and an inner periphery of the aforementioned transmitting hole 31 is attached. In an example illustrated, for reducing a sliding resistance, a one-directional sealing member of a lip type is installed in a direction for blocking an air flow directed from the main pilot pressure chamber 24*b* to the transmitting chamber 30*a*. The sealing member 34 may also be formed from an O-ring or other member having appropriate cross-sectional shape.

As described above, since the aforementioned transmitting rod 33 intervenes between both the diaphragms 14 and 17*a*, the auxiliary diaphragm 17*a* is displaced toward the main diaphragm 14 side by means of the pilot fluid which is also supplied to the auxiliary pilot pressure chamber 30*b* at the same time when the pilot fluid is supplied into the main pilot pressure chamber 24*b* and the main diaphragm 14 is pressed to the main valve seat 16. This results in pressing the main diaphragm 14 toward the main valve seat 16 via the aforementioned transmitting rod 33 and therefore, the valve-closing force of the main diaphragm 14 is strengthened to an extent of operating force by means of the auxiliary diaphragm 17*a*.

Further, when the pilot fluid in both the aforementioned pilot pressure chambers 24*b* and 30*b* is discharged, the force for pressing both the aforementioned diaphragms 14 and 17*a* toward a valve-closing direction is lost and thereby the main diaphragm 14 is pressed up by operating force of a main fluid from the supply port P and the main valve seat 16 is opened. This opening operation of the main diaphragm 14 is transmitted to the auxiliary diaphragm 17*a* via the aforementioned transmitting rod 33 and the auxiliary diaphragm 17*a* is also displaced upward in the drawing together.

Currently, as is clear from FIG. 1 and FIG. 2, a range of stroke of the aforementioned auxiliary diaphragm 17*a* is set to be larger than an operating stroke of the main diaphragm 14. When the main diaphragm 14 is pressed to the main valve seat 16 by that the pilot fluid is supplied into both of the aforementioned pilot pressure chambers 24*b* and 30*b*, the auxiliary diaphragm 17*a* is configured to stop at a position short of a stroke end. A slight gap is configured to thereby intervene between the auxiliary diaphragm 17*a* and a seat 30*c*. By thus configuring, when the aforementioned diaphragm 14 is in contact with the main valve seat 16, the operating force generated by means of the auxiliary diaphragm 17*a* is completely transmitted to the main diaphragm 14 via the aforementioned transmitting rod 33.

The aforementioned housing 13 is composed of a first block 13*a* having the aforementioned attaching surface 18, a second block 13*b* connected to the first block 13*a*, and a third block 13*c* connected to the second block 13*b*. Further, the aforementioned main valve chamber 24 is partitioned and formed, and the aforementioned main diaphragm 14 is disposed between the aforementioned first block 13*a* and the second block 13*b*. In addition, an outer peripheral portion of the main diaphragm 14 is sandwiched between both the first block 13*a* and the second block 13*b* and fixed thereto. Further, the aforementioned auxiliary valve chamber 30 is partitioned and formed, and the aforementioned auxiliary diaphragm 17*a* is disposed between the aforementioned second block 13*b* and the third block 13*c*. In addition, an outer peripheral portion of the auxiliary diaphragm 17*a* is sandwiched between both the second block 13*b* and the third block 13*c* and fixed thereto. Furthermore, the aforementioned transmitting rod 33 is provided in the aforementioned second block 13*b*. Moreover, the aforementioned pilot supply flow path 22 and the pilot discharge flow path 23 are extending in a manner so as to straddle across each of the blocks.

According to such a construction of the housing 13, by removing the aforementioned second block 13*b*, the auxiliary diaphragm 17*a*, and the transmitting rod 33, and by connecting the aforementioned first block 13*a* and the third block 13*c* each other via the main diaphragm 14, a diaphragm-type electromagnetic valve of a normal type having no closing-force strengthening mechanism can be formed.

Incidentally, in each of the aforementioned blocks 13a, 13b, and 13c, projections and holes are formed on each of joining surfaces thereof, and each of the blocks 13a, 13b, and 13c is configured to be mutually connected in a positioned condition by mutually engaging the projections and the holes, however illustration therefor is omitted.

The aforementioned pilot valve portion 12 is detachably attached to a concave step portion 36 formed on an upper surface of the aforementioned third block 13c. The pilot valve portion 12 has a construction as a normal-open type three-port electromagnetic valve, and is composed of a flow path switching portion 41 for switching a communicating condition of the pilot flow path with the pilot valve member 43 and a solenoid-operated portion 42 for operating the aforementioned pilot valve member 43.

In the aforementioned flow path switching portion 41 at a side surface of the valve body 45, the aforementioned pilot supply port PI, which is allowed to communicate with the aforementioned pilot supply flow path 22, the pilot output port PA, which is allowed to communicate with both the aforementioned pilot pressure chambers 24b and 30b through the aforementioned continuous holes 26a and 26b, and the aforementioned pilot discharge port PR, which is allowed to communicate with the aforementioned pilot discharge flow path 23 are provided. Further, a pilot valve chamber where each of the aforementioned ports is allowed to communicate with is provided inside the aforementioned valve body 45, and the aforementioned pilot valve member 43 is housed in the pilot valve chamber. A pilot supply valve seat 50 surrounding a periphery of the aforementioned pilot supply port PI and a pilot discharge valve seat 51 surrounding a periphery of the pilot discharge port PR are alternately opened and closed by means of the pilot valve member 43.

On the other hand, the aforementioned solenoid-operated portion 42 is provided with an exciting coil 53 wound around a bobbin 52, a fixed core 54 and a movable core 55 housed in a center hole of the bobbin 52, and a core reset spring 56 for resetting the movable core 55 to an initial position, and the aforementioned movable core 55 is combined with the aforementioned pilot valve member 43 by means of the combination bar 58.

Further, in a condition where the power is not distributed to the aforementioned exciting coil 53, as illustrated at a lower half part in FIG. 1, the aforementioned movable core 55 is advanced up to the initial position by means of spring force of the core-reset spring 56, and the pilot valve member 43 is pressed to the pilot discharge valve seat 51 via the combination bar 58. Therefore, the pilot discharge valve seat 51 is closed and the pilot supply valve seat 50 is opened, and the pilot discharge port PR is cut off. This results in a condition where the pilot supply port PI and the pilot output port PA are allowed to communicate with each other. In this condition, the pilot fluid from the aforementioned pilot supply port PP is supplied to the main pilot pressure chamber 24b at a back side of the aforementioned main diaphragm 14 via the aforementioned pilot supply port PI and the pilot output port PA, and is also supplied to the auxiliary pilot pressure chamber 30b at a back side of the auxiliary diaphragm 17a.

On the other hand, when the power is distributed to the aforementioned exciting coil 53, as illustrated at an upper half part in FIG. 1, the aforementioned movable core 55 is retreated up to an operating position by being absorbed by the fixed core 54. Therefore, the pilot valve member 43 is separated from the aforementioned pilot discharge valve seat 51 by being pressed by the valve-reset spring 57, and is pressed to the pilot supply valve seat 50. Therefore, the aforementioned pilot discharge valve seat 51 is opened and the pilot output port PA and the pilot discharge port PR are allowed to communicate with each other, and the pilot supply valve seat 50 is closed and the pilot supply port PI is cut off. In this condition, the pilot fluid is discharged by that both the aforementioned pilot pressure chambers 24b and 30b are opened outside.

A numeral 59 in the drawing denotes a connector for use in receiving electricity where a connector for use in supplying electricity from a control apparatus is connected.

A diaphragm-type electromagnetic valve 10A having the aforementioned construction is used in a condition such as that the supply port P and the pilot supply port PP are connected to a common pressurized fluid source (compressed air source) 60 via the manifold base and the pilot discharge port PE is opened outside, and that the output port A is connected to a load (for example, a tank) 61, as illustrated in FIG. 1.

Currently, in a condition that the power for the exciting coil 53 of the aforementioned pilot valve portion 12 is not distributed, as described above, the pilot supply valve seat 50 is opened and the pilot supply port PI and the pilot output port PA are allowed to communicate with each other and thereby the pilot fluid from the pilot supply port PP is supplied to the aforementioned main pilot pressure chamber 24b and the auxiliary pilot pressure chamber 30b. Accordingly, the main diaphragm 14 is pressed to the main valve seat 16 by means of the operating force generated by the pilot fluid, and the main flow path 15 from the supply port P to the output port A is cut off. At the same time, the aforementioned auxiliary diaphragm 17a is displaced toward the main diaphragm 14 side by means of the pilot fluid supplied to the auxiliary pilot pressure chamber 30b. Further, the auxiliary diaphragm 17a presses the main diaphragm 14 to the main valve seat 16 via the aforementioned transmitting rod 33. As a result, the valve-closing force of the main diaphragm 14 is strengthened to the extent of operating force by means of the auxiliary diaphragm 17a.

When the power is distributed to the aforementioned exciting coil 53, the pilot supply port PI is cut off and the pilot output port PA and the pilot discharge port PR are allowed to communicate with each other and thereby the pilot fluid in both the aforementioned pilot pressure chambers 24b and 30b is discharged outside from the pilot discharge port PE. Consequently, the main diaphragm 14 is pressed up by the operating force of the main fluid from the supply port P and is separated from the min valve seat 16. Further, the supply side main flow path 15P at the main flow path 15 and the output side main flow path 15A are allowed to communicate with each other, and thereby main fluid is allowed to flow into the output port A and is supplied to the aforementioned load 61.

Currently, the displacement of the aforementioned main diaphragm 14 is transmitted to the auxiliary diaphragm 17a via the aforementioned transmitting rod 33, and the auxiliary diaphragm 17a is also displaced together upward in the drawing.

When the power distribution for the aforementioned exciting coil 53 is stopped after a required amount of the main fluid is supplied and filled up into the aforementioned load 61, the pilot fluid is supplied into both the aforementioned pilot pressure chambers 24b and 30b and thereby, as described above, the main diaphragm 14 is pressed to the main valve seat 16 and the main flow path 15 is closed. At the same time, a condition where the auxiliary diaphragm 17a presses the main diaphragm 14 toward the closing direction via the transmitting rod 33 is made and a condition where the main fluid is filled up in the load 61 is held.

In the above-described condition where the main fluid is held in a filled-up state, for example, in a case when the other electromagnetic valve connected in parallel with the aforementioned pressure fluid source 60, not shown, is operated and the main fluid is supplied into the other load, fluid pressure of the aforementioned pilot supply port PP is temporarily lowered and the pilot fluid pressure in both the pilot pressure chambers 24b and 30b are also lowered in response thereto.

Currently, in such a diaphragm-type electromagnetic valve of a normal type that is not provided with the aforementioned auxiliary valve body 17, the main diaphragm 14 is sometimes temporarily separated from the main valve seat 16 due to the pressure at a load 61 side, namely adverse pressure that is applied via the output port A, and the condition where the main fluid is held in a filled-up state sometimes becomes unstable.

However, in the electromagnetic valve according to the aforementioned embodiment, since the valve-closing force of the main diaphragm 14 is strengthened by means of the auxiliary valve body 17, even when the fluid pressure of the load 61 side is applied as an adverse pressure in an opening direction to the main diaphragm 14 through the output port A, there is no possibility that the main diaphragm 14 is separated from the main valve seat 16, and the aforementioned condition where the main fluid is held in a filled-up state is held in a stable manner.

Figure 3:
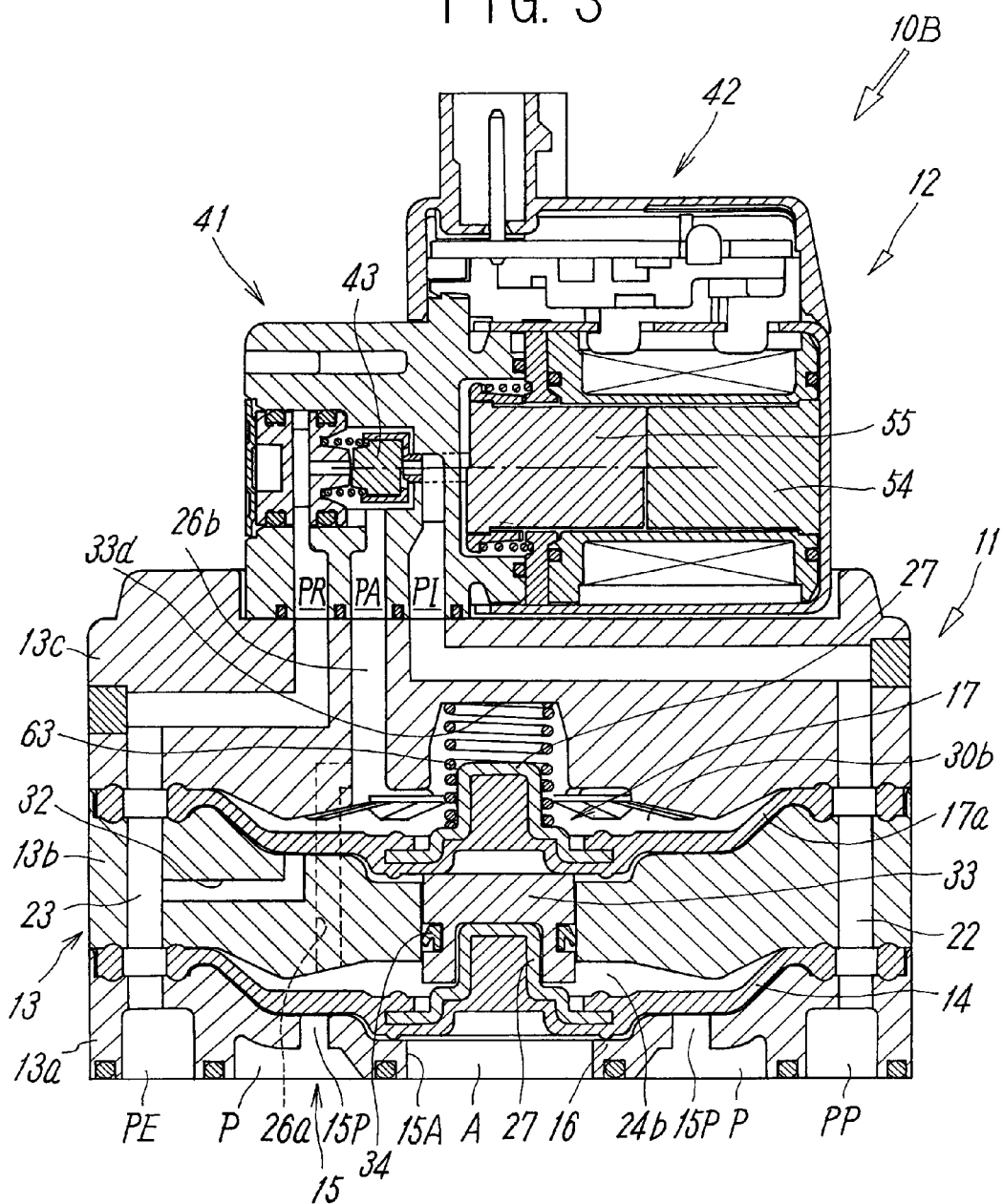
FIG. 3 is a cross-sectional view illustrating an electromagnetic valve according to a second embodiment with respect to the present invention.

FIG. 3 illustrates a second embodiment of the present invention. A point of difference between an electromagnetic valve 10B according to the second embodiment and the aforementioned electromagnetic valve 10A according to the first embodiment is that the auxiliary diaphragm 17a is constantly biased toward the main diaphragm 14 side with a pressure spring 63. That is, the aforementioned pressure spring 63 is caused to intervene between the cap 27 at a back surface (upper surface) of the aforementioned auxiliary diaphragm 17a and a bottom wall of a concave portion 30d formed at a center portion of the auxiliary pilot pressure chamber 30b, and the auxiliary diaphragm 17a is pressed toward the main diaphragm 14 side by means of the pressure spring 63. Accordingly, in the electromagnetic valve 10B according to the second embodiment, the valve-closing force of the main diaphragm 14 is strengthened to an extent of the biasing force of the aforementioned pressure spring 63 compared to the electromagnetic valve 10A according to the aforementioned first embodiment.

Incidentally, a construction and operation of the electromagnetic valve 10B according to the second embodiment other than the above-described is substantially the same as that of the electromagnetic valve 10A according to the aforementioned first embodiment, and therefore the same numerals used in the first embodiment are attached to the main and same component part in the second embodiment, and the explanation thereof is omitted.

Figure 4:
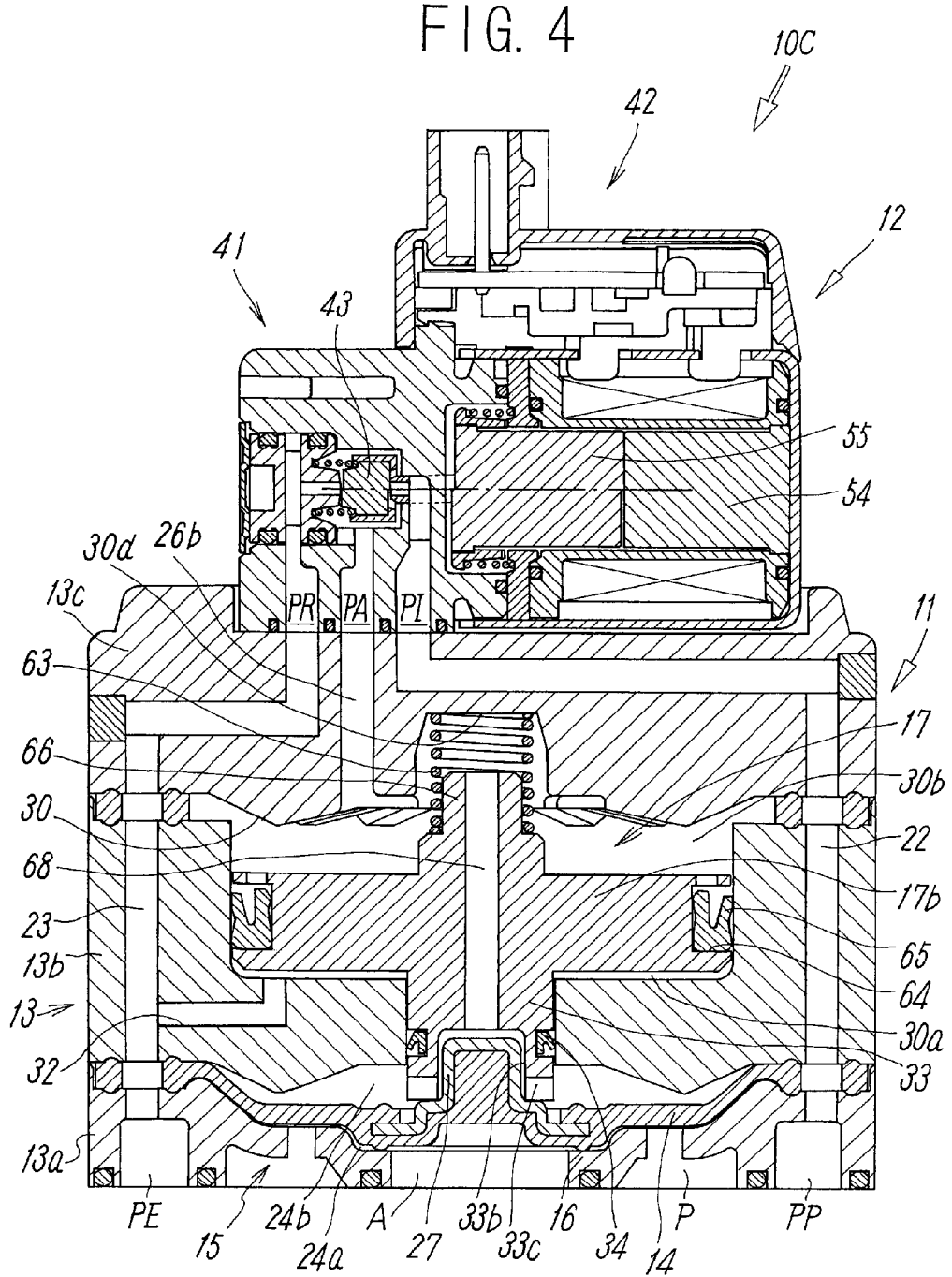
FIG. 4 is a cross-sectional view illustrating an electromagnetic valve according to a third embodiment with respect to the present invention.

FIG. 4 illustrates a third embodiment of the present invention, and a point of difference between the electromagnetic valve 10C according to the third embodiment and the electromagnetic valve 10B according to the aforementioned second embodiment is that the auxiliary valve body 17 is not formed with a diaphragm but a piston 17B. That is, in an auxiliary valve chamber 30 formed in the housing 13, the aforementioned piston 17b having a disk shape is slidably housed, and the auxiliary valve chamber 30 is partitioned into the auxiliary pilot pressure chamber 30b and the transmitting chamber 30a by means of the piston 17b. A circularly shaped concave groove 64 is formed around an outer periphery of the aforementioned piston 17b. In the concave groove 64, one directional sealing member 65 of a lip type is installed in a direction for blocking an air flow directed from an auxiliary pilot pressure chamber 30b to the transmitting chamber 30a. However, the sealing member 65 may be formed from the O-ring or other member having appropriate cross-sectional shape.

Further, at a center portion of an upper surface of the aforementioned piston 17b, a shaft portion 66 for fitting the concave portion 30d at a center part of the aforementioned auxiliary pilot pressure chamber 30b is formed. Furthermore, the pressure spring 63 for biasing the aforementioned piston 17b toward the main diaphragm 14 side is caused to intervene between a step portion of the outer periphery of the shaft portion 66 and the bottom wall of the concave portion 30d.

Moreover, the aforementioned piston 17b and the transmitting rod 33 are integrally formed. The cap 27 of the upper surface of the aforementioned main diaphragm 14 fits into the concavity 33b formed at a lower end (tip end) of the transmitting rod 33 in a condition where a gap is caused to intervene around the cap 27. A circular portion of the tip end of the transmitting rod 33 that surrounds the aforementioned concavity 33b is in contact with a shoulder portion of the cap 27. Further, by means of a continuous hole 68 penetrating through an inner part of the piston 17b and the transmitting rod 33, the aforementioned auxiliary pilot pressure chamber 30b and the main pilot pressure chamber 24b are allowed to communicate with each other. An end portion of the transmitting rod 33 side of the continuous hole 68 is opened in the aforementioned concavity 33b and is allowed to communicate with the aforementioned main pilot pressure chamber 24b through the concavity 33b. Grooves 33c for use in distributing the fluid are formed at the circular portion of the tip end of the aforementioned transmitting rod 33 in a radial direction.

Incidentally, a construction and operation of the electromagnetic valve 10C according to the third embodiment other than the above-described is substantially the same as that of the electromagnetic valve 10B according to the aforementioned second embodiment, and therefore the same numerals in the second embodiment are attached to the main and same component part in the third embodiment, and the explanation thereof is omitted.

Figure 5:
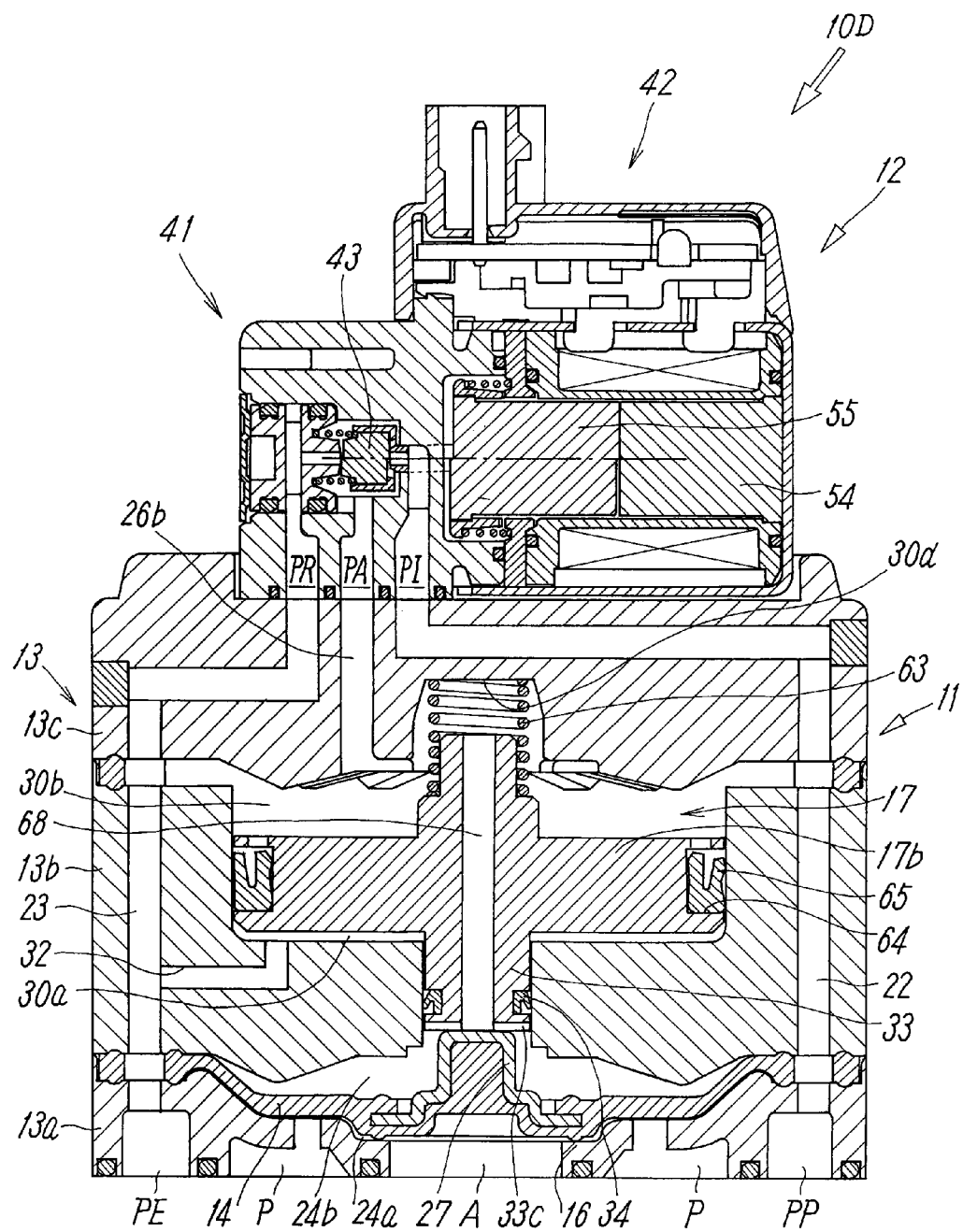
FIG. 5 is a cross-sectional view illustrating an electromagnetic valve according to a fourth embodiment with respect to the present invention.

FIG. 5 illustrates a fourth embodiment of the present invention. A point of difference between the electromagnetic valve 10D according to the fourth embodiment and the electromagnetic valve 10C according to the aforementioned third embodiment is that the tip end portion of the transmitting rod 33 is formed into a substantially flat surface having no concavity to which the cap 27 is fitted, and the tip end portion is in contact with the upper surface of the cap 27 of the upper surface of the main diaphragm 14. At the tip end portion, the groove 33c for smoothly introducing the pressurized fluid from the continuous hole 68 into the main pilot pressure chamber 24b is formed in a radial direction.

Incidentally, a construction and operation of the electromagnetic valve 10D according to the fourth embodiment other than the above-described is substantially the same as that of the electromagnetic valve 10C according to the aforementioned third embodiment, and therefore the same numerals in the third embodiment are attached to the main and same component part in the fourth embodiment, and the explanation thereof is omitted.

Incidentally, in the electromagnetic valves 10C and 10D according to the aforementioned third and fourth embodiment, respectively, although the piston 17b and the transmitting rod 33 are integrally formed, the same may be separately formed. Further, although the main pilot pressure chamber 24b and the auxiliary pilot pressure chamber 30b are allowed to communicate with each other by means of the continuous hole 68 penetrating through the inner part of the aforementioned piston 17b and the transmitting rod 33, the same may be allowed to communicate with each other by means of the continuous hole 26a formed at an inner part of the housing 13 as in a case of the electromagnetic valve 10A according to the first embodiment.

Furthermore, in the electromagnetic valves 10A through 10D according to each of the embodiments illustrated, although only one set of the auxiliary valve body 17 and the transmitting rod 33 is provided, the same may be provided in two sets or more. In this case, a plurality of auxiliary valve bodies 17 and transmitting rods 33 are disposed in a condition such as that the same serially continue in turn.

Figure 6:
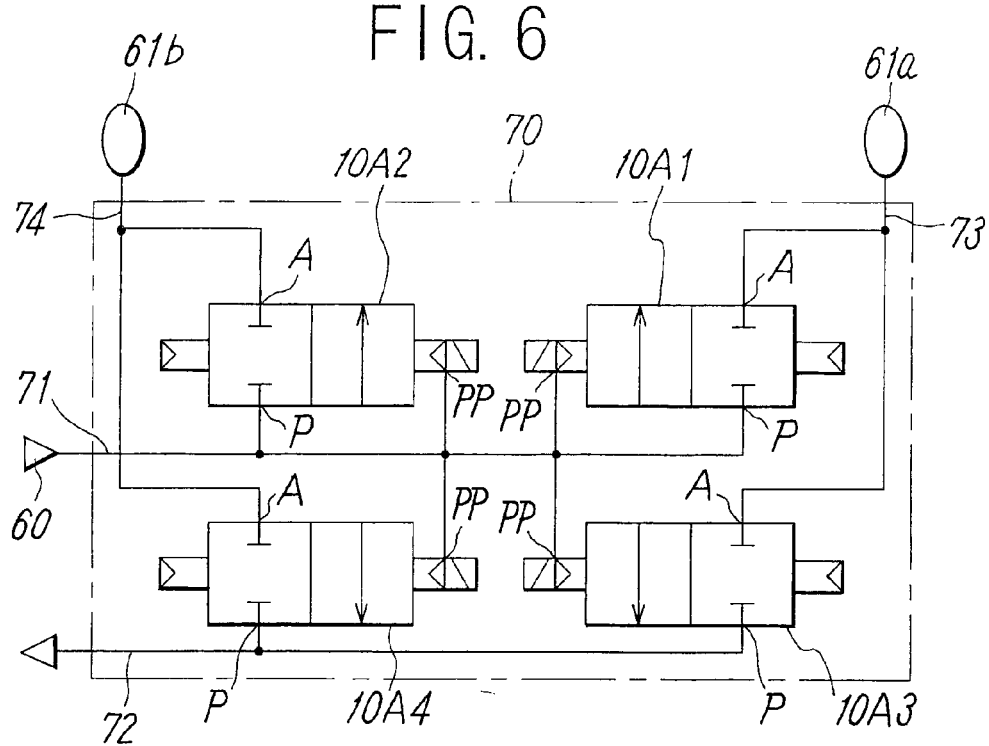
FIG. 6 is an air pressure circuit diagram showing an electromagnetic valve assembly constructed with electromagnetic valves according to the first embodiment by marks.
Figure 7:
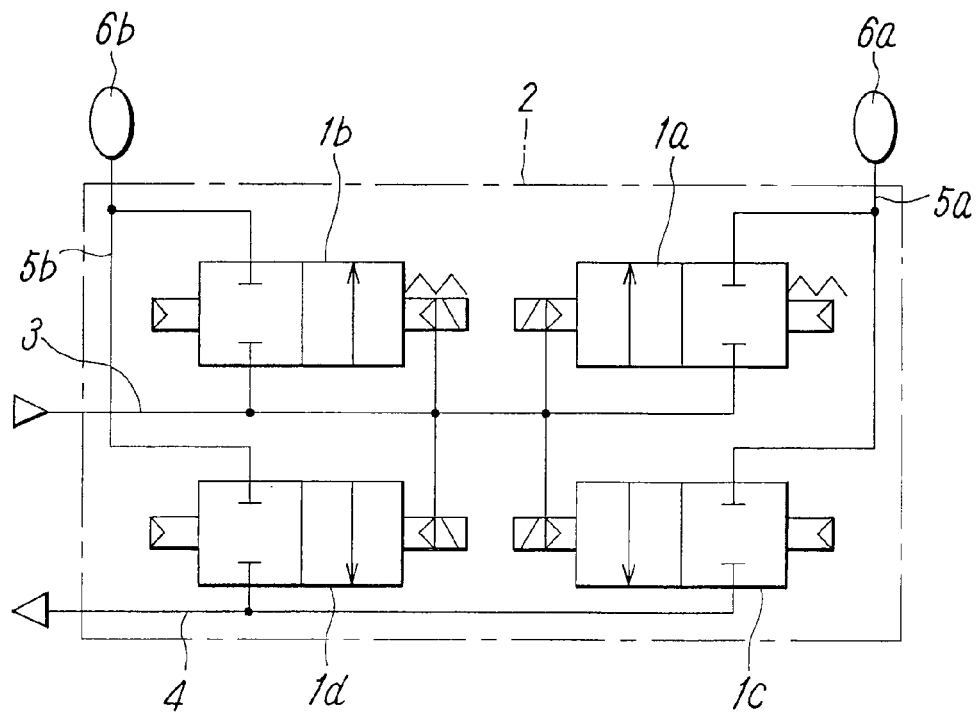
FIG. 7 is an air pressure circuit diagram showing a conventional electromagnetic valve assembly by marks.

In FIG. 6, a construction of an electromagnetic valve assembly for use in the oxygen condensation, which is constructed using the electromagnetic valve 10A according to the aforementioned first embodiment, is illustrated with marks. The electromagnetic valve assembly is formed by mounting four electromagnetic valves 10A1 through 10A4 on a manifold base 70. The supply port P of each of the first electromagnetic valve 10A1 and the second electromagnetic valve 10A2, and the pilot supply port PP of each of the first through fourth electromagnetic valves 10A1 through 10A4 are respectively connected to a flow path 71 for use in supplying in a lump of the manifold base 70, and are connected to the compressed air source 60 via the flow path 71 for use in supplying in a lump. Further, the supply port P of each of the third electromagnetic valve 10A3 and the fourth electromagnetic valve 10A4, and a pilot discharge port (not shown) of each of the first through fourth electromagnetic valves 10A1 through 10A4 are respectively connected to a flow path 72 for use in discharging in a lump of the manifold base 70, and are opened outside via the flow path 72 for use in discharging in a lump.

Furthermore, the output ports A of the aforementioned first electromagnetic valve 10A1 and the third electromagnetic valve 10A3 are respectively connected to a first flow path 73 for use in outputting of the manifold base 70, and are connected to a first load 61a serving as a tank for use in condensing oxygen through the first flow path 73 for use in outputting. Similarly, the output ports A of the second electromagnetic valve 10A2 and the fourth electromagnetic valve 10A4 are respectively connected to a second flow path 74 for use in outputting of the manifold base 70, and are connected to a second load 61b serving as a tank for use in condensing oxygen through the second flow path 74 for use in outputting.

In the aforementioned electromagnetic valve assembly, the supply of the compressed air into the first load 61a and the second load 61b is performed by means of the first electromagnetic valve 10A1 and the second electromagnetic valve 10A2, and the discharge of the compressed air from the aforementioned loads 61a and 61b, respectively, is performed by means of the third electromagnetic valve 10A3 and the fourth electromagnetic valve 10A4. That is, the supply of the compressed air into the first load 61a is performed by switching the first electromagnetic valve 10A1 to a valve-open position opposite to a case shown in FIG. 6 by distributing the power to the first electromagnetic valve 10A1, and an operation for holding a filled-up state after the supply is performed by switching the first electromagnetic valve 10A1 to a valve-closed position shown in FIG. 6 by stopping the power distribution to the first electromagnetic valve 10A1. Currently, the third electromagnetic valve 10A3 occupies the valve-closed position shown in FIG. 6 by not distributing the power.

Moreover, the discharge of the compressed air from the first load 61a is performed by switching the third electromagnetic valve 10A3 to the valve-open position opposite to the case shown in FIG. 6 by distributing the power to the aforementioned third electromagnetic valve 10A3. Currently, the aforementioned first electromagnetic valve 10A1 occupies the valve-closed position shown in FIG. 6 by not distributing the power.

The supply and discharge of the compressed air to the second load 61b is also performed by that the second electromagnetic valve 10A2 and the fourth electromagnetic valve 10A4 are operated to switch in the similar manner as described above.

Currently, even when the air pressure in the flow path 71 for use in supplying in a lump is temporarily lowered by that the compressed air is supplied into the second load 61b when the second electromagnetic valve 10A2 is operated in a condition where the first electromagnetic valve 10A1 is closed and the filled-up state is held after the compressed air is supplied into the aforementioned first load 61a, and when the fluid pressure of the first load 61a side is applied to the main diaphragm 14 in the opening direction as the adverse pressure through the output port A, there is no possibility that the main diaphragm 14 temporarily opens the main valve seat 16. This is because, as described above, the valve-closing force of the main diaphragm 14 is strengthened by means of the auxiliary valve body 17 in the aforementioned first electromagnetic valve 10A1. This can be said for a case that the compressed air is supplied into the first load 61a by means of the first electromagnetic valve 10A1 in a condition where the compressed air is filled up into the second load 61b by means of the second electromagnetic valve 10A2 and held.

A similar electromagnetic valve assembly can be formed using the electromagnetic valves 10B through 10D according to the aforementioned second through fourth embodiments, respectively. In this regard, it is preferable to use the third electromagnetic valve and the fourth electromagnetic valve for use in discharging having no pressure spring 63 mentioned above for pressing the auxiliary valve body 17 toward the main diaphragm 14 side. The reason is that when the compressed air in the load 61 is discharged, residual pressure to an extent of the biasing force generated by the pressure spring 63 remains in the load 61.

Incidentally, as the aforementioned third electromagnetic valve and fourth electromagnetic valve for use in discharging, a diaphragm-type electromagnetic vale of a normal type, which is not provided with the aforementioned auxiliary valve body 17, may be used.

The invention claimed is:

1. A diaphragm-type electromagnetic valve with closing-force strengthening mechanism comprising:
    a diaphragm valve portion including
        a supply port and an output port for use in a main fluid opening to an attaching surface,
        a main valve seat positioned in a half way of a main flow path connecting both of the ports,
        a main diaphragm for opening and closing the main flow path while being in contact with or separating from the main valve seat, and
        a main pilot pressure chamber generating operating force in a direction for the main diaphragm to be in contact with the main valve seat, in a housing having the attaching surface for attaching the housing to a manifold base, and
    a solenoid-operated type pilot valve portion for supplying and discharging a pilot fluid to the main pilot pressure chamber,
    wherein the diaphragm valve portion further includes an auxiliary valve body for strengthening valve-closing force of the main diaphragm, an auxiliary pilot pressure chamber for applying the pilot fluid from the pilot valve portion to the auxiliary valve body, and a transmitting rod for transmitting operating force of the auxiliary valve body to the main diaphragm by displacing in junction with the auxiliary valve body.

2. The electromagnetic valve according to claim 1, wherein the auxiliary valve body and the transmitting rod are disposed in serial with the main diaphragm in a concentric position with the main diaphragm, and the main pilot pressure chamber and the auxiliary pilot pressure chamber are allowed to communicate with each other.

3. The electromagnetic valve according to claim 2, wherein by setting a range of stroke of the auxiliary valve body to be larger than an operating stroke of the main diaphragm, the auxiliary valve body is configured to occupy a position short of a stroke end when the pilot fluid is supplied into both the pilot pressure chambers, and the main diaphragm is thereby in contact with the main valve seat.

4. The electromagnetic valve according to claim 2, wherein the auxiliary valve body is formed from a piston, and the transmitting rod is integrally formed with the piston, and wherein the auxiliary pilot pressure chamber and the main pilot pressure chamber are allowed to communicate with each other by means of a continuous hole penetrating through an inner part of the piston and the transmitting rod.

5. The electromagnetic valve according to claim 2, wherein the housing includes a first block having the attaching surface, a second block connected to the first block, and a third block connected to the second block, and wherein the main diaphragm is disposed between the first block and the second block, and the auxiliary valve body is disposed between the second block and the third block, and the transmitting rod is provided in the second block, and wherein a diaphragm-type electromagnetic valve having no closing-force strengthening mechanism can be formed by removing the second block, the auxiliary valve body, and the transmitting rod, and by connecting the first block and the third block each other via the main diaphragm.

6. The electromagnetic valve according to claim 1, wherein by setting a range of stroke of the auxiliary valve body to be larger than an operating stroke of the main diaphragm, the auxiliary valve body is configured to occupy a position short of a stroke end when the pilot fluid is supplied into both the pilot pressure chambers, and the main diaphragm is thereby in contact with the main valve seat.

7. The electromagnetic valve according to claim 1, wherein the auxiliary valve body is formed from a diaphragm and the auxiliary valve body is formed to have a same shape and same size as a shape and size of the main diaphragm.

8. The electromagnetic valve according to claim 1, wherein the auxiliary valve body is a piston.

9. The electromagnetic valve according to claim 1, wherein the housing includes a first block having the attaching surface, a second block connected to the first block, and a third block connected to the second block, and wherein the main diaphragm is disposed between the first block and the second block, and the auxiliary valve body is disposed between the second block and the third block, and the transmitting rod is provided in the second block, and wherein a diaphragm-type electromagnetic valve having no closing-force strengthening mechanism can be formed by removing the second block, the auxiliary valve body, and the transmitting rod, and by connecting the first block and the third block each other via the main diaphragm.

* * * * *